(12) United States Patent
Rodenberg (10) Patent No.: US 8,193,444 B2
(45) Date of Patent: Jun. 5, 2012

(54) CONDUIT BOX

(75) Inventor: Lee Michael Rodenberg, Evansville, IN (US)

(73) Assignee: Big Sky Eight, LLC, Evansville, IN (US)

( * ) Notice: Subject to any disclaimer, the term of this patent is extended or adjusted under 35 U.S.C. 154(b) by 120 days.

(21) Appl. No.: 12/403,354

(22) Filed: Mar. 12, 2009

(65) Prior Publication Data

US 2010/0230127 A1    Sep. 16, 2010

(51) Int. Cl.
*H02G 3/08* (2006.01)

(52) U.S. Cl. ........... 174/50; 174/58; 174/60; 174/63; 174/64; 174/57; 439/535; 248/906

(58) Field of Classification Search .......... 174/50, 174/57, 58, 60, 63, 64; 439/535; 248/906; 220/3.2, 4.02

See application file for complete search history.

(56) References Cited

U.S. PATENT DOCUMENTS

| | | | | |
|---|---|---|---|---|
| 2,730,261 | A | * | 1/1956 | Tutt .................. 220/3.7 |
| 5,448,012 | A | * | 9/1995 | Jacob ............... 174/53 |
| 5,596,174 | A | * | 1/1997 | Sapienza ........... 174/57 |
| 6,066,803 | A | * | 5/2000 | Hagarty ............. 174/50 |
| 7,022,912 | B1 | * | 4/2006 | Kilburn ............. 174/50 |
| 7,165,366 | B2 | | 1/2007 | Anliker |
| 7,842,884 | B2 | * | 11/2010 | Johnson ............ 174/58 |
| 7,897,871 | B1 | * | 3/2011 | Shemtov ............ 174/59 |
| 8,058,552 | B2 | * | 11/2011 | Kruse et al. ....... 174/53 |

\* cited by examiner

*Primary Examiner* — Dhirubhai R Patel
(74) *Attorney, Agent, or Firm* — Barnes & Thornburg LLP (57) ABSTRACT

A conduit box includes a first rear wall and a second rear wall spaced apart form the first rear wall to form a stair-stepped rear wall of the conduit box. The conduit box also includes a top wall, bottom wall, a first sidewall, and a second sidewall. The top and bottom walls have a substantial "L"-shape. The second sidewall has a length that is greater than the length of the first sidewall. The conduit box also include a rear sidewall extending from the first rear wall to the second rear wall.

16 Claims, 9 Drawing Sheets

CONDUIT BOX

TECHNICAL FIELD

The present disclosure relates generally to electrical distribution systems and devices and, more particularly, to conduit boxes of such systems for housing and distributing electrical wiring via pipe conduits.

BACKGROUND

Conduit boxes are used in an electrical distribution system to house electrical wires and provide access to such electrical wires. In some cases, a conduit box may also house one or more electrical outlets, switches, or other electrical devices. Depending on the construction in which the conduit boxes are being placed, the electrical wires may be fed to the conduit boxes in pipe conduits. If so, the pipe conduits are typically coupled to the conduit boxes via a conduit fitting or coupler.

In rough construction, conduit boxes are typically secured to the outer surface of a wall or wall stud. According to many local building codes, the pipe conduits feeding the conduit boxes must also be secured to the wall or wall stud. However, due to the size of the conduit boxes and placement of the pipe conduits, some or all of the pipe conduits may require bending to properly orient the pipe conduit for coupling with the conduit box. For example, when mounting a typical conduit box to a concrete wall, the conduit box is secured to a mounting member (typically known as a "unistrut"), which is secured to the concrete wall. As such, the typical conduit box is spaced away from the wall thereby requiring the pipe conduit to be bent in order to properly align with the pipe conduit holes of the conduit box.

SUMMARY

According to one aspect, an apparatus may include a conduit box. The conduit box may include a first rear wall and a second rear wall. The second rear wall may be spaced apart from the first rear wall. The first rear wall may define a first depth of the conduit box. Similarly, the second rear wall may define a second depth of the conduit box. The second depth may be greater than the first depth. In some embodiments, the first rear wall and the second rear wall may be substantially parallel with respect to each other. Additionally, the first rear wall and the second rear wall may be spaced apart from each other by a rear sidewall extending from the first rear wall to the second rear wall. In some embodiments, the rear sidewall may have a length of at least one inch.

In some embodiments, the conduit box may also include a top wall and a bottom wall. The top and bottom walls may be substantially L-shaped. Additionally, the conduit box may include a first sidewall and a second sidewall. The second sidewall may have a length greater than the first sidewall. The first sidewall may be coupled directly to the first rear wall and the second sidewall may be coupled directly to the second rear wall. In some embodiments, the first sidewall, the second sidewall, and the rear sidewall may be substantially parallel with respect to each other. Additionally, in some embodiments, the second sidewall may be greater than the length of the first sidewall by at least one inch.

Each of the first and second rear walls may include at least one knockout and at least one mounting hole in some embodiments. If so, the mounting hole(s) may be sized to receive a fastener for securing the conduit box to a structure. Additionally, in some embodiments, the conduit box may include a top wall, a bottom wall, a first sidewall, and a second sidewall. The top and bottom walls may be substantially L-shaped. The second sidewall may have a length greater than the first sidewall. Additionally, each of the top wall, bottom wall, first sidewall, and second sidewall include a front end surface, the front end surfaces may define an opening of the conduit box. Further, in some embodiments, the top wall may include a first tab extending inwardly from the front end surface of the top wall and the bottom wall may include a second tab extending inwardly from the front end surface of the bottom wall. In such embodiments, each of the first and second tab may include a threaded aperture. Additionally or alternatively, the conduit box may include a wall having a front end surface. In such embodiments, the first rear wall may be spaced from the front end surface a first distance and the second rear wall may be spaced from the front end surface a second distance. The second distance may be greater than the first distance.

According to another aspect, a conduit box may include a top wall and a bottom wall. Each of the top wall and the bottom wall may be substantially L-shaped and may include a front end surface. The conduit box may also include a first rear wall extending from the top wall to the bottom wall. The first rear wall may be positioned a first distance from the front end surface of the top wall. The conduit box may also include a second rear wall extending from the top wall to the bottom wall. The second rear wall may be positioned a second distance from the front end surface of the top wall. The second distance may be greater than the first distance. For example, the second distance may be at least 0.5 inches greater than the first distance in some embodiments.

In some embodiments, the first rear wall and the second rear wall may be stair-stepped with respect to each other. Additionally, in some embodiments, the conduit box may include a rear sidewall extending from the first rear wall to the second rear wall. In such embodiments, the rear sidewall may have a length greater than about 0.5 inches. The conduit box may also include a first sidewall and a second sidewall. In such embodiments, the top wall, the bottom wall, the first rear wall, the second rear wall, the rear sidewall, the first sidewall, and the second sidewall may define an inner chamber of the conduit box. Additionally, the first sidewall, the second sidewall, and the rear sidewall may each be substantially parallel with each other and include at least one knockout.

According to a further aspect, a conduit box may include a top wall and a bottom wall. The bottom wall may be substantially parallel to the top wall. The conduit box may also include a first sidewall coupled to the top wall and the bottom wall. The first sidewall may have a first length. The conduit box may also include a second sidewall opposite the first sidewall. The second sidewall may be coupled to the top wall and the bottom wall and may have a second length greater than the first length by at least 0.5 inches. The first rear wall may be coupled to the top wall, the bottom wall, and the first sidewall. The conduit box may further include a second rear wall substantially parallel to the first rear wall. The second rear wall may be coupled to the top wall, the bottom wall, and the second sidewall. The conduit box may also include a rear sidewall substantially parallel to the first and second sidewalls, the rear sidewall may be coupled to the top wall, the bottom wall, the first rear wall, and the second rear wall.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIGS. 1-5, in one embodiment, a conduit box 10 is sized and shaped so as to be secured to a wall or wall stud and couplable to a plurality of pipe conduits. As discussed in more detail below, due to the shape of the conduit box 10, the pipe conduits may be coupled to the conduit box 10 without being bent or otherwise curved. The conduit box 10 includes a top wall 12, a bottom wall 14, a short sidewall 16, a long sidewall 18, and a rear wall 20. The walls 12, 14, 16, 18, 20 define an inner chamber or cavity 22, which has an opening 24 defined on a front side 26 of the conduit box.

Each of the walls 12, 14, 16, 18, 20 may abut, confront, be coupled to, or be secured to each adjacent wall. That is, in some embodiments, each of the conduit box 10 may be formed from a unitary piece of material, for example, stamped or cut from initially flat material and subsequently folded into shape. In such embodiments, the walls 12, 14, 16, 18, 20 and one or more adjacent walls may be welded together or otherwise coupled or secured to each other. However, in some embodiments, one or more walls 12, 14, 16, 18, 20 may abut or confront an adjacent wall without being directly secured thereto. Additionally, in some embodiments, the conduit box 10 may be formed from multiple, individual parts. Further, in some embodiments, the conduit box 10 may be molded or otherwise formed from a unitary or monolithic material. For example, the conduit box 10 may be formed from a molded plastic or similar material. In such embodiments, the walls 12, 14, 16, 18, 20 may be integrally coupled or secured to each adjacent wall. As such, it should be appreciated that in one particular embodiment, the conduit box 10 is formed from a metallic material such as steel, but may be formed from other materials in other embodiments.

The top wall 12 includes a front section 30 and a rear section 32 extending from the front section 30 on a lateral rear side so as to create a generally "L"-shape. As such, the front section 30 of the top wall 12 defines a short lateral side 34 of the top wall 12 and the rear section 32 (and the front section 30) define a long lateral side 36 of the top wall 12. The bottom wall 12 has a shape substantially similar to the top wall 12. The bottom wall 14 includes a front section 38 and a rear section 40 extending from the front section 34 on a lateral rear side. Similar to the top wall 12, the bottom wall 14 also has a generally "L"-shape and includes a short lateral side 42 defined by the front section 38 and a long lateral side 44 defined by the rear section 40 (and the front section 38). In the illustrative embodiment, the top wall 12 and the bottom wall 14 are substantially parallel to each other.

The sidewall 16 extends from the top wall 12 to the bottom wall 14. Similarly, the sidewall 18 extends from the top wall 12 to the bottom wall 14. In the illustrative embodiment, the sidewalls 16, 18 are substantially parallel to each other. The sidewall 16 is coupled to, abuts, or otherwise confronts the short lateral sides 34, 42 of the top and bottom walls 12, 14 and the sidewall 18 is coupled to, abuts, or otherwise confronts the long lateral sides 36, 44 of the top and bottom walls 12, 14. As such, the sidewall 18 has a length 46 greater than a length 48 of the sidewall 16. For example, in one embodiment, the sidewall 18 has a length 46 that is at least 0.5 inches or greater than the length 48 of the sidewall 16. In one particular embodiment, the length 48 is equal to about 3.875 inches and the length 46 is equal to about 1.625 inches.

The conduit box 10 includes a rear side 28, which is formed by the rear wall 20, opposite the front side 26. The rear wall 20 includes a first or proximal rear wall 50 and a second or distal rear wall 52. The proximal rear wall 50 and distal rear wall 52 are spaced apart from each other by a rear sidewall 54. That is, the rear wall 52 is stair-stepped with respect to the rear wall 50. The rear sidewall 54 extends from the proximal rear wall 50 to the distal rear wall 52 and is substantially parallel to the sidewalls 16, 18. The proximal rear wall 50 defines a first depth 58 of the inner chamber 22 of the conduit box 10 and the distal rear wall 52 defines a second depth 56 of the inner chamber 22. The second depth 56 is greater than the first depth 58. For example, in one embodiment, the second depth 56 is greater than the first depth 58 by 0.5 inches or more. In one particular embodiment, the second depth 56 is equal to about 3.875 inches and the first depth 58 is equal to about 1.625 inches.

Each of the top wall 12, the bottom wall 14, the sidewall 16, and the sidewall 18 include a respective front end surface 60, 62, 64, 66. In the illustrative embodiment, the front end surfaces 60, 62, 64, 66 are substantially planar with each other and define the front side 26 of the conduit box 10. As discussed above, the walls 12, 14, 16, 18, 20 define the inner chamber or cavity 22 and the front end surfaces 60, 62, 64, 66 define the opening 24 of the cavity 22. Additionally, in the illustrative embodiment, the conduit box 10 includes a top tab 70 extending downwardly or inwardly from the front end surface 60 of the top wall 12 and a bottom tab 72 extending upwardly or inwardly from the front end surface 62 of the bottom wall 14. Each of the tabs 70, 72 includes an aperture 74, 76, respectively, defined therein. In one embodiment the apertures 74, 76 are threaded and configured to receive a fastener such that a coverplate (not shown), outlet plate (not shown), or other plate may be secured to the conduit box 10 on the front side 26.

Although the conduit box 10 has a generally "L'-shape as discussed above, the particular dimensions of the conduit box 10 may depend upon the particular application. In the illustrative embodiment, the front sections 30, 38 of the walls 12, 14 have a length 80 of about 1.625 inches and the rear sections 32, 40 have a length 82 of about 3.875 inches. Additionally, the top wall 12 and bottom wall 14 have a width 84 of about 4.0 inches. As discussed above, the sidewall 16 has a length 48 of about 1.625 inches and a height 86 of about 4.0 inches. The sidewall 18 has a length 46 of about 3.875 inches and a height 88 of about 4.0 inches. The rear wall 50 has a length 90 of about 1.875 inches and a height 92 of about 4.0 inches. The rear wall 52 has a length 94 of about 2.125 inches and a height 96 of about 4.0 inches. Additionally, the rear sidewall 54 has a length 98 of about 2.250 inches and a height 100 of about 4.0 inches.

In the illustrative embodiment, each of the walls 12, 14, 16, 18, 50, 52, 54 includes one or more knockouts 102 for receiving a pipe conduit and/or pipe conduit fitting or coupler. The knockouts 102 are embodied as predefined or pre-established perforated shapes, which may be pushed, hammered, or otherwise removed from the conduit box 10 so as to define an aperture in the respective wall 12, 14, 16, 18, 50, 52, 54. In the illustrative embodiment, each knockout 102 is defined by a large diameter perforated circle 104 and a small diameter perforated circle 106 (see FIG. 4). The small diameter circle 106 is internally tangent to the large diameter circle 104. In use, depending on the size of pipe conduit being used, the small or large diameter circle 104, 106 of the knockouts 102 may be removed so as to define a small or large hole as needed. In the illustrative embodiment, the large diameter circle 104 has a diameter of about 0.75 inches and the small diameter circle 106 has a diameter of about 0.5 inches. However, in other embodiments, the knockouts 102 may have different diameters. The conduit box 10 may include any number of knockouts 102. In the illustrative embodiment, the top and bottom walls 12, 14 each include three knockouts 102. The sidewall 18 includes four knockouts 102. The sidewall 16, rear wall 50, and rear side wall 54 each include two knockouts 102. The rear wall 52 includes one knockout 102. Additionally, the rear walls 50, 52 also include one or more mounting holes or apertures 110. The mounting holes 110 are shaped and sized to receive a fastener (not shown) to secure the conduit box 10 to a wall stud or wall as discussed in more detail below.

Figure 1:
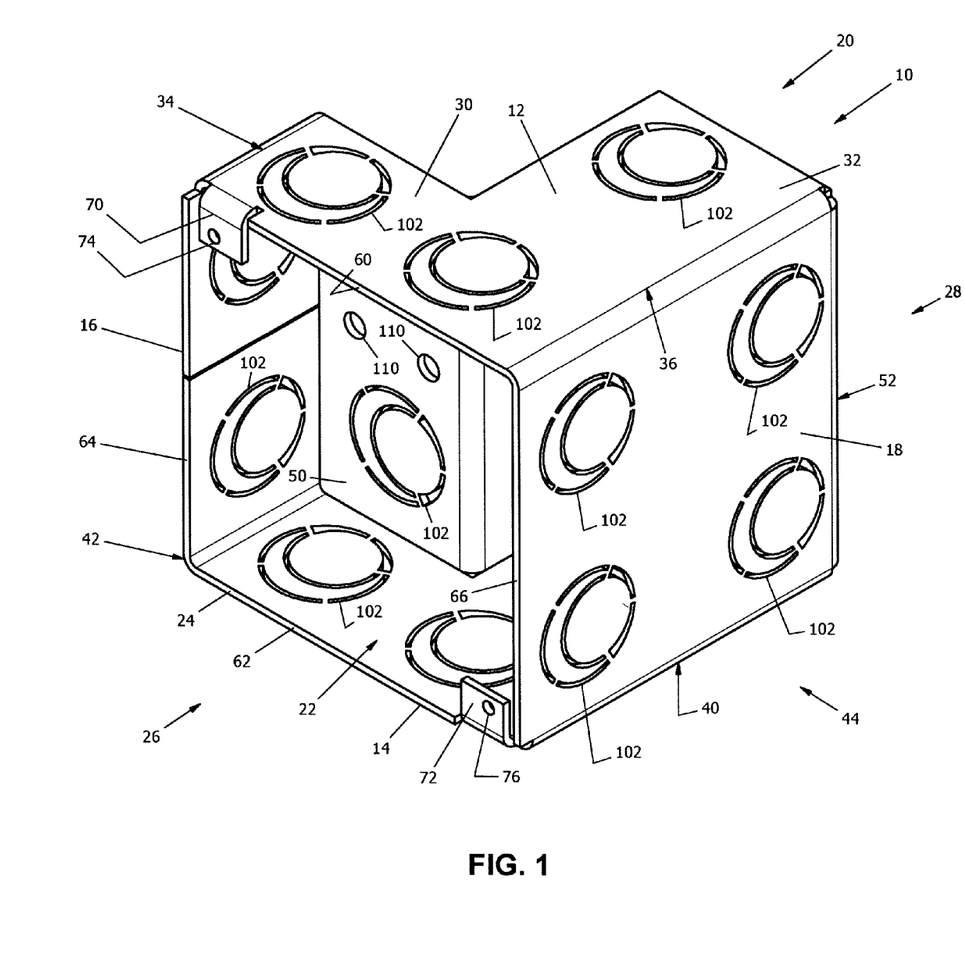
FIG. 1 is a perspective view of one embodiment of a conduit box.
Figure 2:
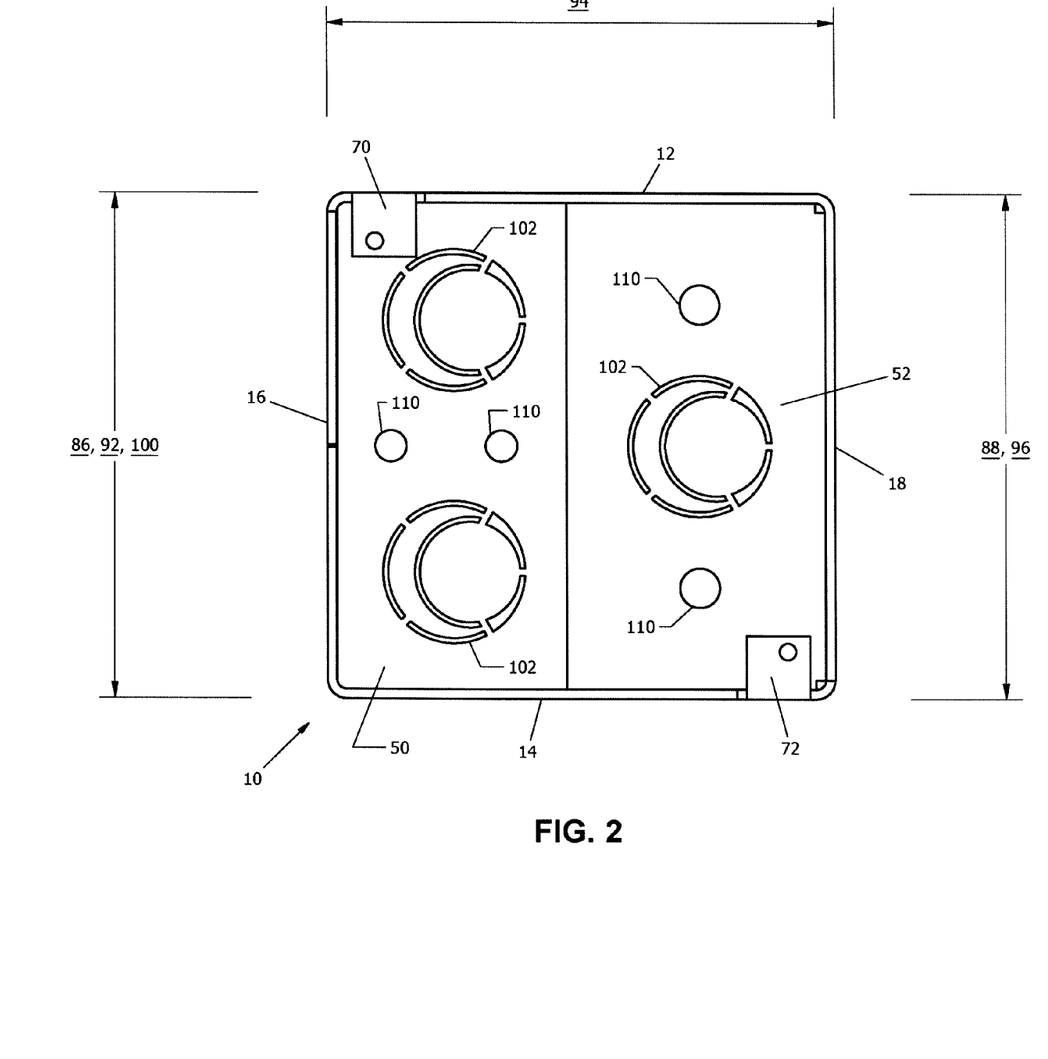
FIG. 2 is a front elevation view of the conduit box of FIG. 1.
Figure 3:
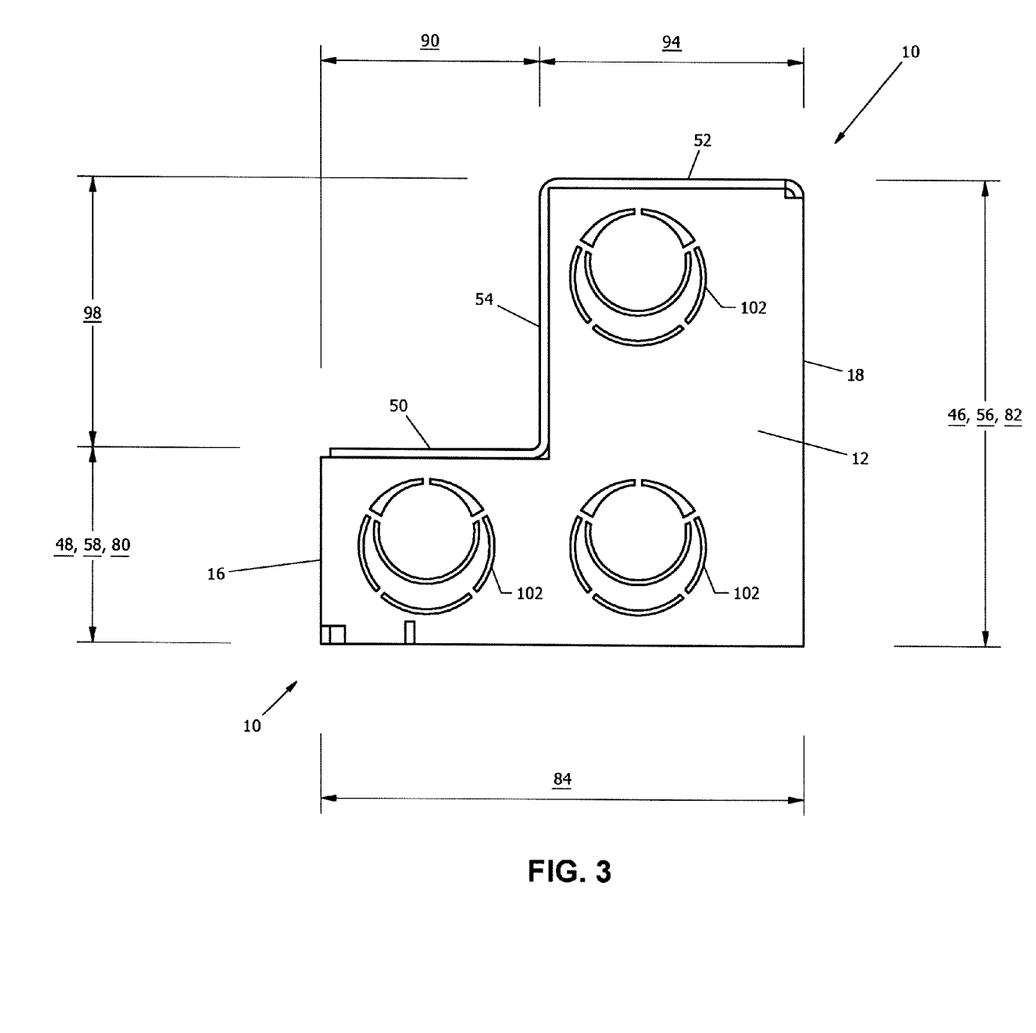
FIG. 3 is a top plan view of the conduit box of FIG. 1.
Figure 4:
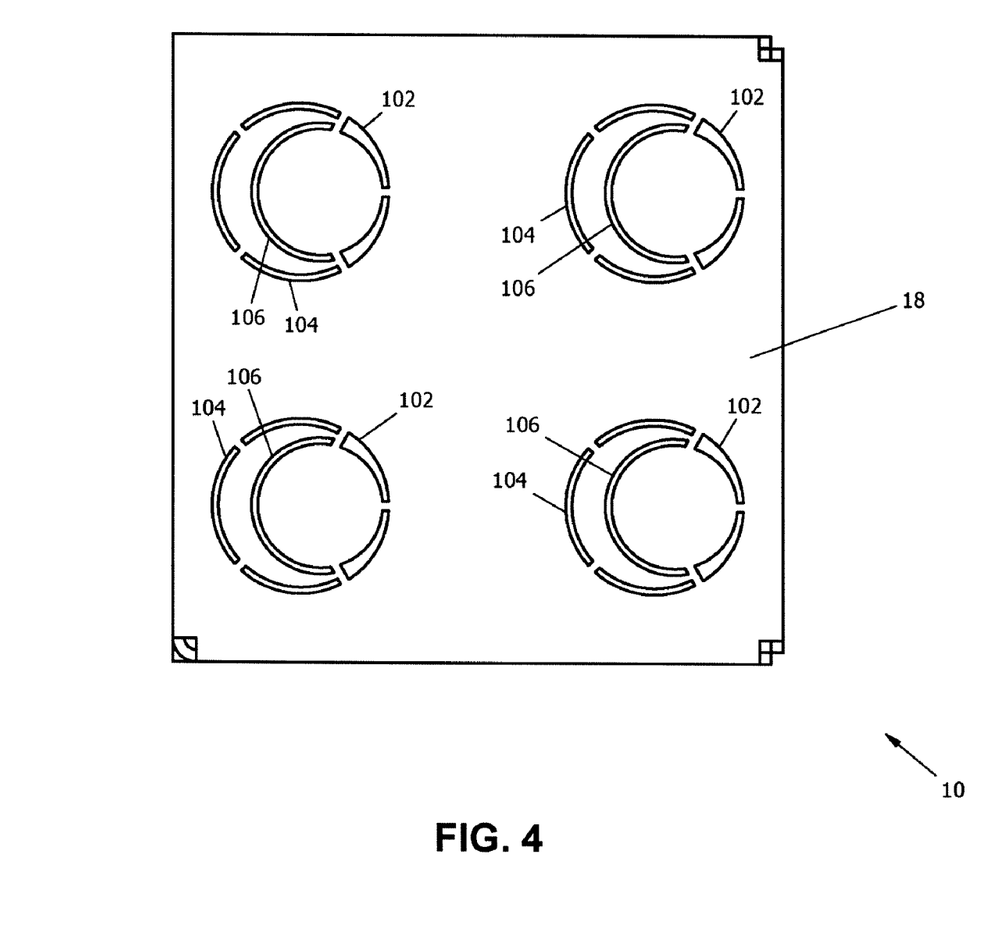
FIG. 4 is a side elevation view of the conduit box of FIG. 1.
Figure 5:
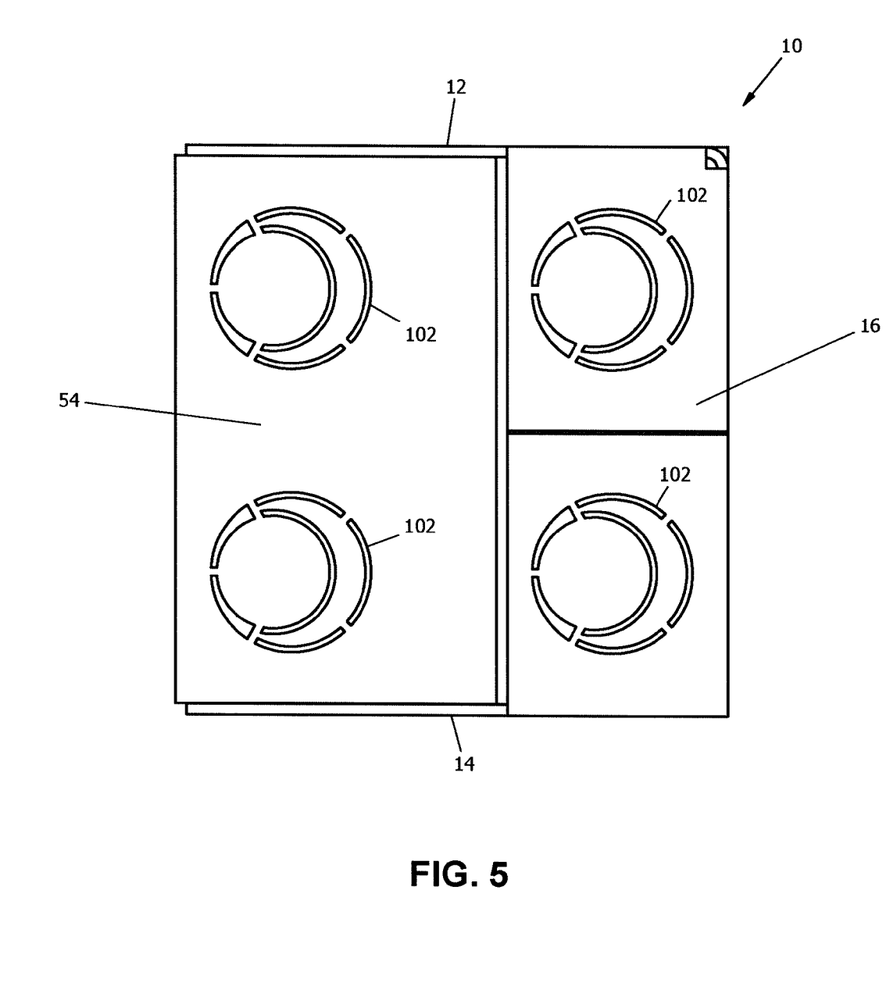
FIG. 5 is another side elevation view of the conduit box of FIG. 1.
Figure 6:
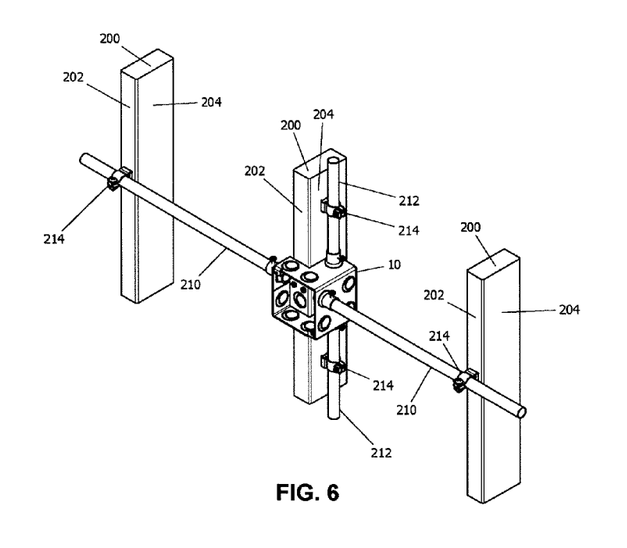
FIG. 6 is a perspective view of the conduit box assembly including the conduit box of FIG. 1 secured to a wall stud.
Figure 7:
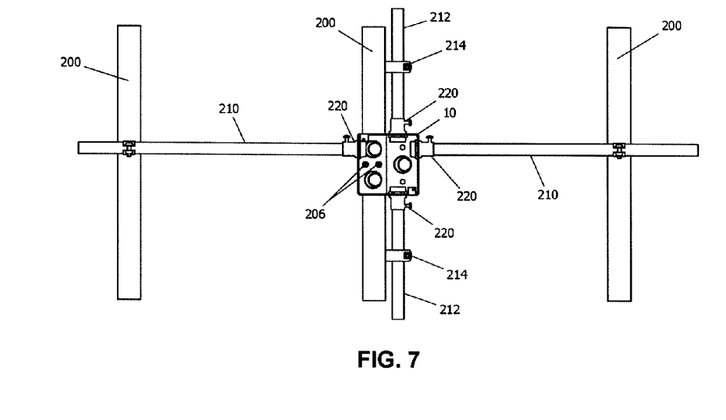
FIG. 7 is a front elevation view of the conduit box assembly of FIG. 6.
Figure 8:
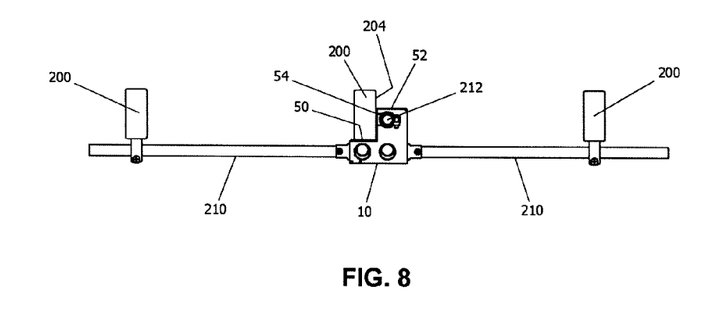
FIG. 8 is a top plan view of the conduit box assembly of FIG. 6.
Figure 9:
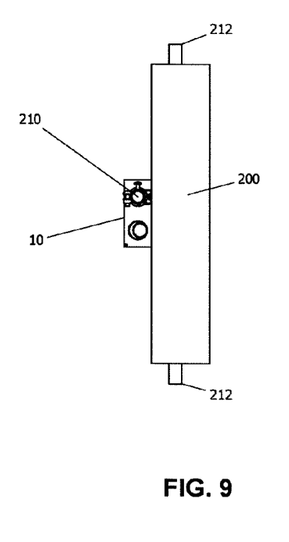
FIG. 9 is a side elevation view of the conduit box assembly of FIG. 6.

Referring now to FIGS. 6-9, in use in one embodiment, the conduit box 10 may be secured to a wall stud 200. The wall stud 200 may be embodied as any type of wall stud such as a wood or metal wall stud. As shown in FIG. 6, the conduit box 10 is secured to a front surface 202 of the wall stud 200. To do so, the conduit box 10 is positioned such that the rear wall 50 abuts the front surface 202 of the stud 200. In such position, the rear sidewall 54 abuts or confronts a side surface 204 of the stud 200. The conduit box 10 is secured to the front surface 202 of the stud 200 via fasteners 206 (see FIG. 7). The fasteners 206 are inserted into the mounting holes 110 of the rear wall 50 and threaded into the wall stud 200.

When the conduit box 10 is secured to the wall stud 200 as described above, a plurality of conduit pipes 210, 212 may be coupled to the conduit box 10 such that electrical wiring carried in the conduit pipes 210, 212 may extend into the inner cavity 22 of the conduit box 10. In a typical construction, the horizontal conduit pipes 210 are secured to the front surfaces 202 of the studs 200 via a plurality of clamps 214. The vertical conduit pipes 212 are secured to the side surfaces 204 of the studs 200 via corresponding clamps 214. Unlike a conventional conduit box wherein at least the vertical conduit pipes 212 would need to be bent or curved outwardly to be coupled to the conventional conduit box, the vertical conduit pipes 212 are coupled to the conduit box 10 without being bent or otherwise curved near the box 10. As illustrated in FIG. 6, the vertical conduit pipes 212 may be coupled to rear section 32, 44 of the top or bottom wall 12, 14. To do so, the appropriately sized knockout 102 is removed and a conduit coupler or fastener 220 is secured to the conduit box 10 and the respective conduit pipe 212 (or 210). It should be appreciated that because the rear wall 52 is spaced farther from the front side 26 of the conduit box 10 than the rear wall 50, the vertical conduit pipes 212 may be coupled to the conduit box 10 without requiring a bend or curve in the pipes 210, 212 near the box 10.

Figure 10:
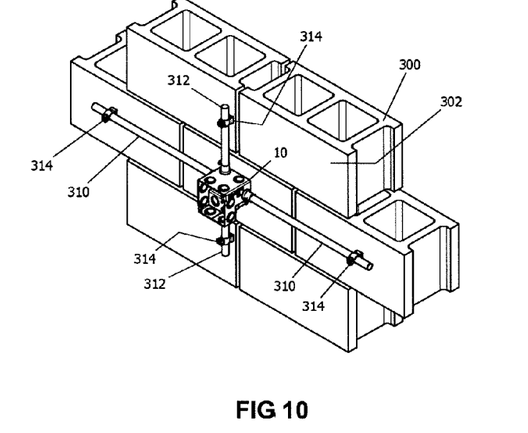
FIG. 10 is a perspective view of another conduit box assembly including the conduit box of FIG. 1 secured to a concrete wall.
Figure 11:
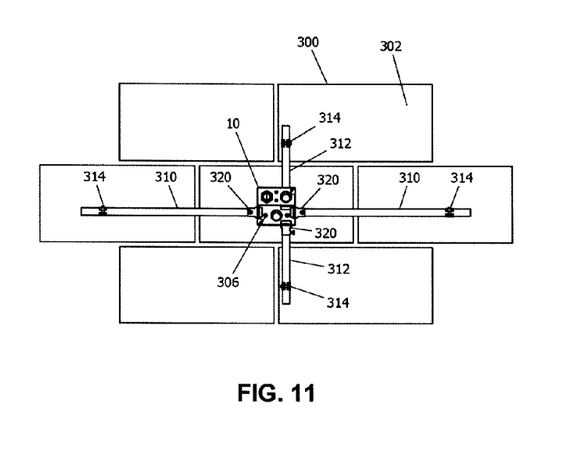
FIG. 11 is a front elevation view of the conduit box assembly of FIG. 10.
Figure 12:
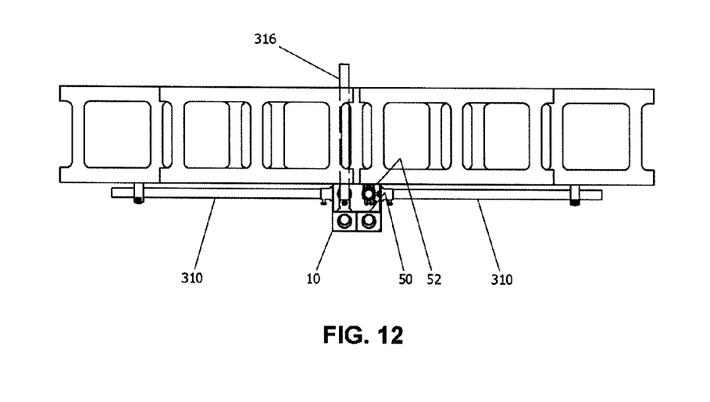
FIG. 12 is a top plan view of the conduit box assembly of FIG. 10.
Figure 13:
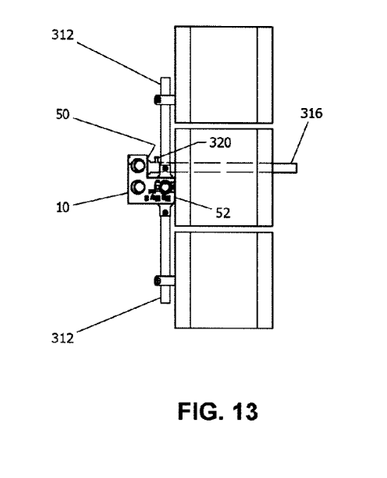
FIG. 13 is a side elevation view of the conduit box assembly of FIG. 10.

Referring now to FIGS. 10-13, in use in one embodiment, the conduit box 10 may be secured to a wall 300, such as a concrete or cinderblock wall. As shown in FIG. 10, the conduit box 10 is secured to a front surface 302 of the wall 300. To do so, the conduit box 10 is positioned such that the rear wall 52 abuts the front surface 302 of the wall 300. In such position, the rear sidewall 52 is spaced apart from the front surface 302 of the wall 300. The conduit 10 is secured to the front surface 302 of the wall 300 via fasteners 306 (see FIG. 11). The fasteners 306 are inserted into the mounting holes 110 of the rear wall 52 and threaded into or otherwise inserted into the wall 300.

When the conduit box 10 is secured to the wall 300 as described above, a plurality of conduit pipes 310, 312 may be coupled to the conduit box 10 such that electrical wiring carried in the conduit pipes 310, 312 may extend into the inner cavity 22 of the conduit box 10. In a typical construction, the horizontal conduit pipes 310 and the vertical pipes 312 are secured to the front surface 302 of the wall 300 via a plurality of clamps 314. Additionally, in a typical construction using a conventional conduit box, the conduit box is spaced away from the front surface 302 of the wall via use of a "unistrut" or other spacing device such that an inner wall conduit pipe 316 may be coupled to the back of the convention conduit box. Such spacing requires that the horizontal conduit pipes 310 and the vertical conduit pipes 312 be bent or otherwise curved to properly couple with the conventional conduit box. However, when the illustrative conduit box 10 is used, the conduit pipes 310, 312 are coupled to the conduit box 10 without being bent or otherwise curved. Additionally, because the rear wall 50 is spaced away from the front surface 302 of the wall 300, an inner wall conduit pipe 316 may be coupled to rear wall 50 of the conduit box 10. To do so, as discussed above, the appropriately sized knockout 102 is removed and a conduit coupler or fastener 320 is secured to the conduit box 10 and the respective conduit pipe 310, 312, 316. It should be appreciated that because the rear wall 52 is spaced farther from the front side 26 of the conduit box 10 than the rear wall 50, the conduit pipes 310, 312, 316 may be coupled to the conduit box 10 without requiring a bend or curve in any of the pipes 310, 312, 316 near the box 10.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatuses, devices, and assemblies described herein. It will be noted that alternative embodiments of the apparatuses, devices, and assemblies of the present disclosure may not include all of the features described yet still benefit from at least some of the advantages of such features. Those of ordinary skill in the art may readily devise their own implementations of the apparatuses, devices, and assemblies that incorporate one or more of the features of the present invention and fall within the spirit and scope of the present disclosure as defined by the appended claims.

The invention claimed is:

1. An apparatus comprising:
a conduit box having: a top wall and a bottom wall, each of the top wall and the bottom wall including a front section and a rear section extending from the front section such that each of the top wall and the bottom wall is substantially L-shaped, the top wall and the bottom wall being substantially parallel with each other;
a first sidewall substantially extending from the top wall to the bottom wall, the first sidewall having a first length, the first sidewall extending from the front section to the rear section, the first length extending from the front section to the rear section;
a second sidewall substantially extending from the top wall to the bottom wall, the second sidewall having a second length that is greater than the first length, the second sidewall extending from the front section toward the rear section, the second length extending from the front toward the back;
a rear sidewall substantially extending from the rear section of the top wall to the rear section of the bottom wall, the rear sidewall being substantially parallel to the first and second sidewalls;
a first rear wall substantially extending (i) from the front section of the top wall to front section of the bottom wall and (ii) from the first sidewall to the rear sidewall; and
a second rear wall substantially extending (i) from the rear section of the top wall to rear section of the bottom wall and (ii) from the second sidewall to the rear sidewall and
wherein (i) each of the first rear wall and the second rear wall includes at least one mounting hole configured to receive a securing device to secure the conduit box to a structure and (ii) one of the top wall, bottom wall, sidewall and rear wall includes a knockout to receive a pipe conduit.

2. The apparatus of claim 1, wherein the first rear wall and the second rear wall are substantially parallel with respect to each other.

3. The apparatus of claim 1, wherein the first sidewall is coupled directly to the first rear wall and the second sidewall is coupled directly to the second rear wall.

4. The apparatus of claim 1, wherein the length of the second sidewall is greater than the length of the first sidewall by at least one inch.

5. The apparatus of claim 4, wherein the rear sidewall has a length of at least one inch.

6. The apparatus of claim 1, wherein each of the first and second rear walls includes at least one knockout.

7. The apparatus of claim 1,
wherein each of the top wall, bottom wall, first sidewall, and second sidewall includes a front end surface, the front end surfaces defining an opening of the conduit box.

8. The apparatus of claim 7, wherein the top wall includes a first tab extending inwardly from the front end surface of the top wall and the bottom wall includes a second tab extending inwardly from the front end surface of the bottom wall, each of the first and second tab including a threaded aperture.

9. The apparatus of claim 1, wherein each of the top wall and the bottom wall includes a front end surface, wherein the first rear wall is spaced from the front end surface of the top wall and the bottom wall a first distance and the second rear wall is spaced from the front end surface of the top wall and the bottom wall a second distance, the second distance being substantially greater than the first distance.

10. A conduit box assembly comprising:
a top wall and a bottom wall, each of the top wall and the bottom wall being substantially L-shaped and including a front end surface;
a first sidewall substantially extending from the top wall to the bottom wall, the first sidewall having a first length, the first sidewall extending from the front end surface toward the back the first length extending from the front toward the back;
a second sidewall substantially extending from the top wall to the bottom wall and being substantially parallel to the first sidewall, the second sidewall having a second length greater than the first length, the second length extending from the front toward the back;
a rear sidewall substantially extending from the top wall to the bottom wall and being substantially parallel to the first and second sidewalls, the rear sidewall including a plurality of knockouts to receive pipe conduit, each of the plurality of knockouts defining an aperture in the rear sidewall when removed from the conduit box;
a first rear wall substantially extending (i) from the top wall to the bottom wall and (ii) from the first sidewall to the rear sidewall,
a second rear wall substantially extending (i) from the top wall to the bottom wall and (ii) from the second sidewall to the rear sidewall, the second rear wall including at least one mounting hole and being secured to a wall by a securing device inserted into the at least one mounting hole; and
a pipe conduit connected to one of the top wall, bottom wall, sidewall and rear wall and received in an aperture defined by one of the plurality of knockouts of said one of the top wall, bottom wall, sidewall and rear wall.

11. The conduit box of claim 10, wherein the second length is at least 0.5 inches greater than the first length.

12. The conduit box of claim 10, wherein the first rear wall and the second rear wall are stair-stepped with respect to each other.

13. The conduit box of claim 10, wherein the rear sidewall having a length greater than about 0.5 inches.

14. The conduit box of claim 13, wherein the top wall, the bottom wall, the first rear wall, the second rear wall, the rear sidewall, the first sidewall, and the second sidewall define an inner chamber of the conduit box.

15. The conduit box of claim 14, wherein the first sidewall, the second sidewall, and the rear sidewall are each substantially parallel with each other and include at least one knockout.

16. A conduit box assembly comprising:
a conduit box comprising:
a top wall and a bottom wall, each of the top wall and the bottom wall being substantially L-shaped and including a front end surface,
a first sidewall substantially extending from the top wall to the bottom wall, the first sidewall having a first length, the first sidewall extending from the front end surface toward the back the first length extending from the front toward the back,
a second sidewall substantially extending from the top wall to the bottom wall and being substantially parallel to the first sidewall, the second sidewall having a second length greater than the first length, the second length extending from the front toward the back, a rear sidewall substantially extending from the top wall to the bottom wall and being substantially parallel to the first and second sidewalls, the rear sidewall including a plurality of knockouts to receive pipe conduit, each of the plurality of knockouts defining an aperture in the rear sidewall when removed from the conduit box, a first rear wall substantially extending (i) from the top wall to the bottom wall and (ii) from the first sidewall to the rear sidewall, the first rear wall including at least one mounting hole to secure the conduit box to a structure, a second rear wall substantially extending (i) from the top wall to the bottom wall and (ii) from the second sidewall to the rear sidewall, a pipe conduit connected to one of said top wall, bottom wall, sidewall, and rear wall and received in an aperture defined by a knockout of said one of the top wall, bottom wall, sidewall and rear wall and a wall stud, wherein the conduit box is secured to the wall stud via a securing device received in the at least one mounting hole of the first rear wall such that the first rear wall and the rear sidewall confront the wall stud.

* * * * *